(12) United States Patent
Smith, Sr.

(10) Patent No.: US 7,395,448 B2
(45) Date of Patent: Jul. 1, 2008

(54) DIRECTLY OBTAINING BY APPLICATION PROGRAMS INFORMATION USABLE IN DETERMINING CLOCK ACCURACY

(75) Inventor: Ronald M. Smith, Sr., Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 11/460,025

(22) Filed: Jul. 26, 2006

(65) Prior Publication Data

US 2008/0028254 A1 Jan. 31, 2008

(51) Int. Cl.
*H04L 7/00* (2006.01)
*G04C 13/04* (2006.01)

(52) U.S. Cl. ......................... 713/400; 368/52

(58) Field of Classification Search ................ 713/400; 368/52
See application file for complete search history.

(56) References Cited

U.S. PATENT DOCUMENTS

| | | | | |
|---|---|---|---|---|
| 4,903,251 A | * | 2/1990 | Chapman | 368/156 |
| 5,195,025 A | * | 3/1993 | Boecker et al. | 700/16 |
| 5,526,512 A | | 6/1996 | Arimilli et al. | 395/473 |
| 5,535,193 A | | 7/1996 | Zhang et al. | 370/17 |
| 5,535,217 A | * | 7/1996 | Cheung et al. | 709/248 |
| 5,577,237 A | | 11/1996 | Lin | 395/555 |
| 5,828,866 A | | 10/1998 | Hao et al. | 395/500 |
| 6,098,178 A | | 8/2000 | Moretti et al. | 713/500 |
| 6,125,404 A | | 9/2000 | Vaglica et al. | 709/400 |
| 6,209,106 B1 | * | 3/2001 | Kubala et al. | 713/500 |
| 6,236,623 B1 | | 5/2001 | Read et al. | 368/46 |
| 6,442,509 B1 | * | 8/2002 | Kokko | 702/187 |
| 6,687,756 B1 | | 2/2004 | Rawson, III | 709/248 |
| 7,065,679 B2 | * | 6/2006 | Nakamura et al. | 714/47 |
| 2003/0048811 A1 | * | 3/2003 | Robie et al. | 370/509 |
| 2005/0198240 A1 | * | 9/2005 | Widera et al. | 709/223 |
| 2005/0276167 A1 | * | 12/2005 | Davies et al. | 368/187 |
| 2007/0061605 A1 | * | 3/2007 | Engler et al. | 713/500 |

OTHER PUBLICATIONS

Mills David, The NTP Timescale and Leap Seconds, Oct. 21, 2004.*
"Precision real-time protocol for data transmission specification IEEE1588", Electronic, Nov. 25, 2003 (Abstract only).
"Implementing declarative concurrency in Java", Ramirez R., et al., 2000, Germany (Abstract only).
U.S. Appl. No. 11/223,886, "System and Method for TOD-Clock Steering", Engler et al., filed Sep. 9, 2005.

* cited by examiner

*Primary Examiner*—Mark Connolly
(74) *Attorney, Agent, or Firm*—John E. Campbell, Esq.; Kevin P. Radigan, Esq.; Heslin Rothenberg Farley & Mesiti, P.C.

(57) ABSTRACT

Information usable in determining the quality of time produced by a clock of a processing environment is obtained. The information is obtained directly by an application program absent use of a supervisor service, such as an operating system or operating system service. The application program invokes an instruction that returns a parameter block that includes the information.

7 Claims, 4 Drawing Sheets

DIRECTLY OBTAINING BY APPLICATION PROGRAMS INFORMATION USABLE IN DETERMINING CLOCK ACCURACY

TECHNICAL FIELD

This invention relates, in general, to timing facilities of processing environments, and in particular, to obtaining information useful in determining the quality of time produced by the timing facilities.

BACKGROUND OF THE INVENTION

Processing environments have various timing facilities, including time of day (TOD) clocks that are used to provide a high resolution measure of real time suitable for the indication of date and time of day. Processes within a processing environment rely on the time produced by these timing facilities to ensure reliable and accurate execution of the processes within the processing environment.

Various protocols have been developed to handle different aspects relating to the timing facilities. For example, time protocols have been developed to manage the synchronization of time between different clocks within and outside of the processing environment.

As a further example, protocols have been developed that enable control programs (e.g., non-application level programs) to obtain information concerning the quality of time produced by the timing facilities. For instance, in the current zSeries® servers, offered by International Business Machines Corporation, the LPAR hypervisor has direct access to time quality information. However, this information is not directly available to application programs. If an application program desires this information, it invokes supervisor services to obtain the information. This is costly, inefficient, and requires additional overhead.

SUMMARY OF THE INVENTION

Based on the foregoing, a need exists for an efficient mechanism to enable application programs to directly obtain time quality information. For example, a need exists for a capability that enables application programs to directly access, without use of supervisor services, information usable in determining the accuracy of time values relative to Coordinated Universal Time (UTC).

The shortcomings of the prior art are overcome and additional advantages are provided through the provision of a method of facilitating a determination of the quality of time produced by clocks of processing environments. The method includes, for instance, providing by a clock of a processing environment a time value; and obtaining, by an application program of the processing environment, information usable in determining the accuracy of the time value relative to an external time standard, wherein the information is obtained by the application program absent use of a supervisor service.

System and computer program products corresponding to the above-summarized method are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a capability is provided for facilitating the determination of the quality of time provided by timing facilities of a processing environment. For example, information is obtained that is usable in determining the accuracy of time values provided by a clock (e.g., a time of day (TOD) clock) of the processing environment relative to an external time standard, such as Coordinated Universal Time (UTC). This information is obtained directly by an application program, without the application program needing to invoke or use a supervisor service. As used herein, a supervisor service includes any non-application level program or service, including, for instance, an operating system, a control program, an operating system service, a hypervisor, etc. The application program does not communicate with the supervisor service to obtain this information (i.e., obtain a control block including the information).

Figure 1A:
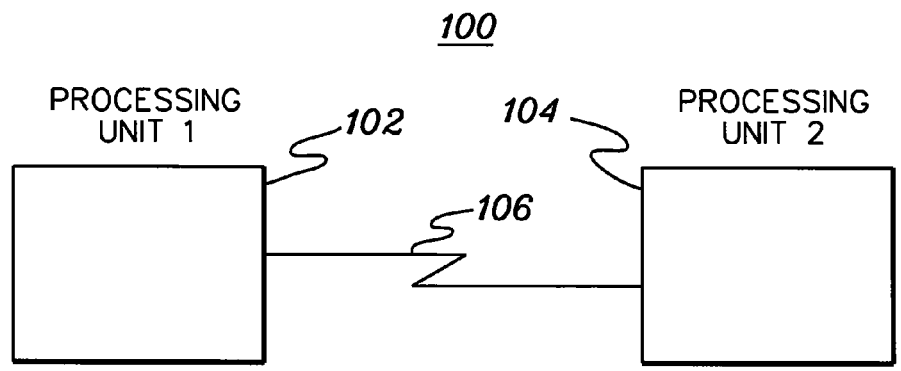
FIG. 1A depicts one embodiment of a processing environment to incorporate and use one or more aspects of the present invention.

One example of a processing environment to incorporate and use one or more aspects of the present invention is described with reference to FIG. 1A. In this particular example, the processing environment is based on the z/Architecture, offered by International Business Machines Corporation, Armonk, N.Y., which is described in "z/Architecture—Principles of Operation", SA22-7932-04, Fifth Edition, September 2005, which is hereby incorporated herein by reference in its entirety.

A processing environment 100 includes, for instance, a processing unit 102 coupled to another processing unit 104 via a connection 106. Each processing unit is, for instance, a zSeries® server, offered by International Business Machines Corporation (IBM®). Connection 106 includes, for instance, one or more links, such as InterSystem Channel (ISC) links or Integrated Cluster Bus (ICB) links, offered by International Business Machines Corporation. In one example, the links employ a Server Time Protocol (STP), also offered by International Business Machines Corporation, to allow timing information to be passed between the processing units. IBM® and zSeries® are registered trademarks of International Business Machines Corporation, Armonk, N.Y., U.S.A. Other names used herein may be registered trademarks, trademarks or product names of International Business Machines Corporation or other companies.

Figure 1B:
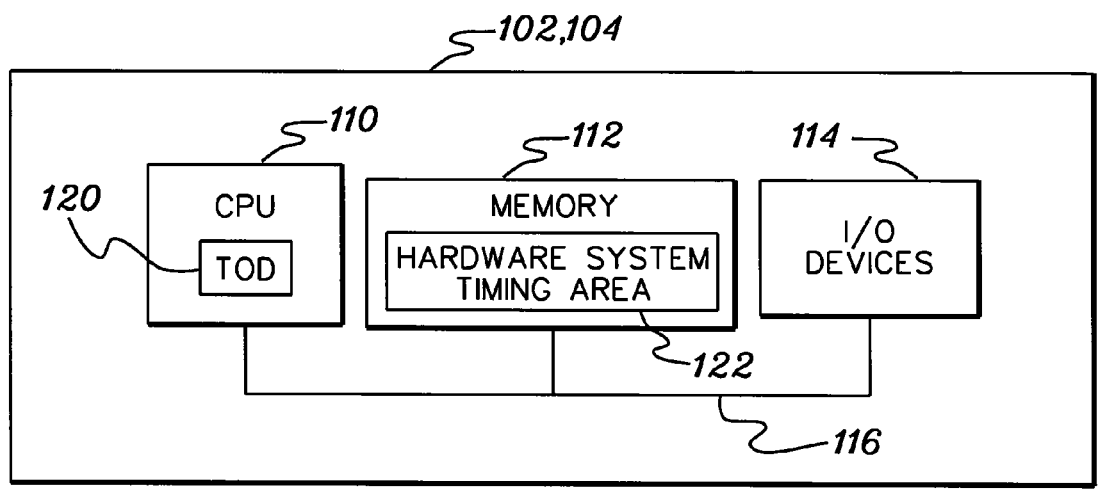
FIG. 1B depicts further details of a processing unit of FIG. 1A, in accordance with an aspect of the present invention.

Each processing unit includes, for example, a central processing unit 110 (FIG. 1B), memory 112 and one or more input/output devices 114 coupled to one another via one or more connections 116, e.g., one or more system buses. Central processing unit 110 includes a clock 120 (e.g., a time of day (TOD) clock) used to provide timing functions for the central processing unit. Further, a portion of memory 112 includes a hardware system timing area 122, which is used by the hardware (e.g., millicode) to maintain timing information.

In this example in which multiple processing units are coupled to one another and each has its own clock, one of the clocks is selected to provide Coordinated Server Time (CST). This clock is relied upon in the processing environment to facilitate synchronization, etc. Further, this clock is useful in determining the quality of time produced by one or more of the clocks, as described below.

Figure 2:
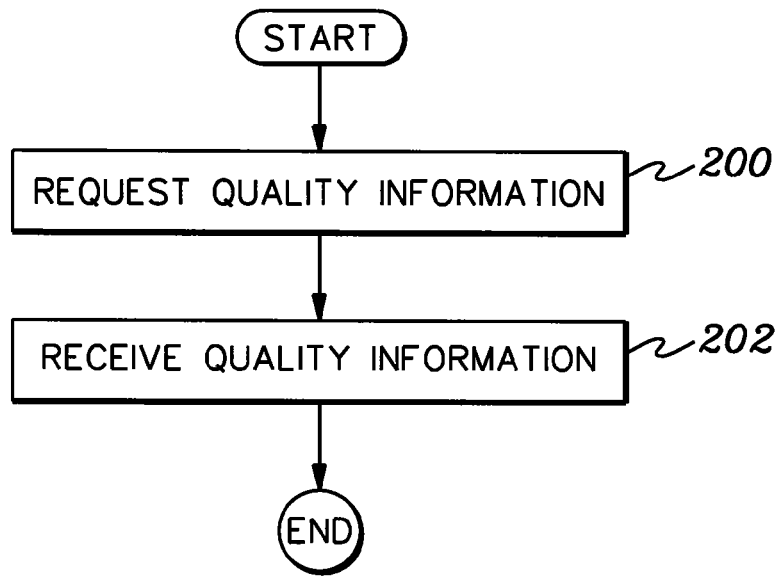
FIG. 2 depicts one embodiment of the logic associated with obtaining information regarding the quality of time values produced by timing facilities of a processing environment, in accordance with an aspect of the present invention.

In accordance with an aspect of the present invention, information usable in determining the quality of timing information produced by a clock of the processing environment is obtained by an application program without the application program calling or using a supervisor service. The application program issues a request for the information (referred to herein as quality information), STEP 200 (FIG. 2), and in response to this request, the information is provided to the application program, STEP 202.

The request is made, in one example, via an instruction, which is further responsible for returning the information to the requesting application. This instruction, referred to herein as Perform Timing Facility Function (PTFF), is described in further detail with reference to FIGS. 3A-3C. Additional details are also described in U.S. patent Ser. No. 11/223,886 entitled "System and Method for TOD-Clock Steering", Engler et al., filed Sep. 9, 2005, which is hereby incorporated herein by reference in its entirety.

Figure 3A:
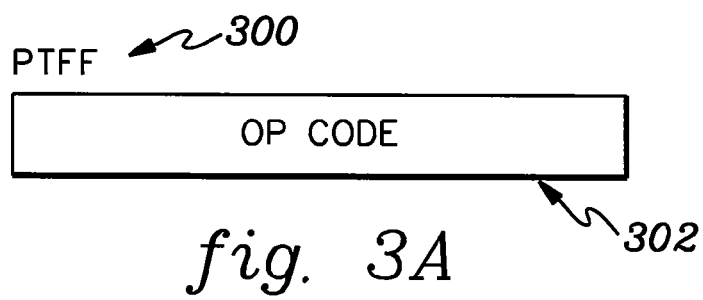
FIG. 3A depicts one embodiment of a format of an instruction used in obtaining information usable in determining the quality of time values, in accordance with an aspect of the present invention.
Figure 3B:
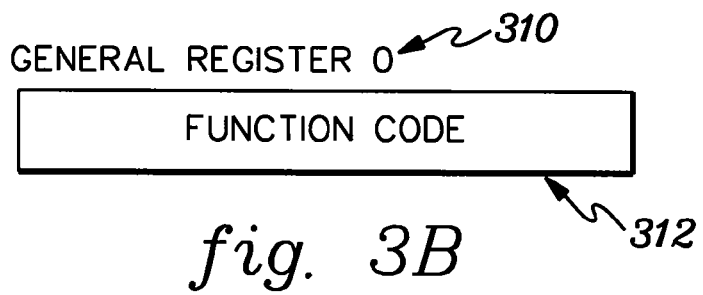
FIG. 3B depicts one embodiment of a general register used by the instruction of FIG. 3A that specifies the function to be performed by the instruction, in accordance with an aspect of the present invention.
Figure 3C:
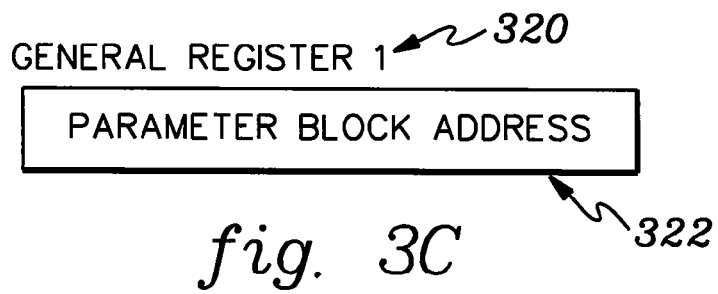
FIG. 3C depicts one embodiment of another register used by the instruction of FIG. 3A that specifies an address of a parameter block returned by the instruction, in accordance with an aspect of the present invention.

Referring to FIG. 3A, the Perform Timing Facility Function is specified by an operation code 300, and it uses two implied operands, general register 0 (310, FIG. 3B) and general register 1 (320, FIG. 3C). General register 0 includes a function code 312 that specifies the function to be performed by the instruction. Although a number of different function codes can be specified, in accordance with an aspect of the present invention, the function code specified is a query coordinated universal time information (QUI) function code.

The PTTF-QUI function obtains information usable in determining the quality of time values produced by a clock of a central processor. In one example, the function locates the desired information in hardware system timing area 122 and places the information in a parameter block. The information in the hardware system timing area is continuously updated (e.g., every 64 ms) by the hardware of the processing environment, irrespective of whether a request is being made for the information. In particular, in one example, a timing network, such as STP, is used to transmit timing information between the various processing units of the processing environment. The hardware (e.g., millicode) of the environment uses this information and/or other information within the processing environment to update the information in the hardware system timing area. This information is then available for use by the PTFF-QUI function.

In response to invoking the instruction, the PTTF-QUI function selects the desired information from the hardware system timing area and places the information in the parameter block specified by the application program. The parameter block is located in memory by an address 322 (FIG. 3C) specified in general register 1. This parameter block, referred to as a UTC information block (UIB), is directly accessible by the application program, and includes information usable in determining the accuracy of time values produced by a selected clock relative to Coordinal Universal Time (UTC).

Figure 4:
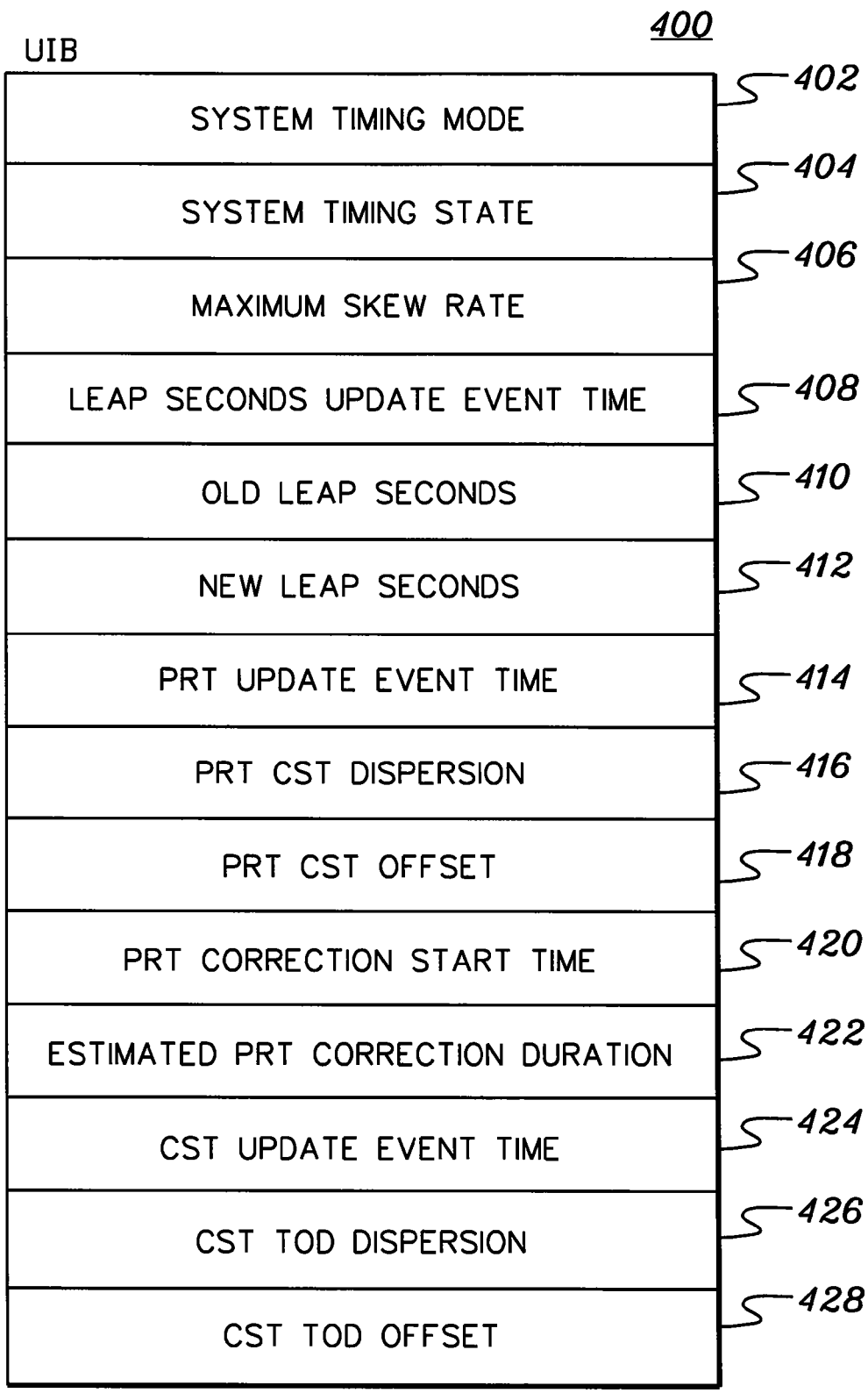
FIG. 4 depicts one embodiment of the fields of the parameter block returned by the instruction, in accordance with an aspect of the present invention.

One embodiment of the fields included in a UIB are described with reference to FIG. 4. A UIB 400 includes, for instance:

a) System Timing Mode 402—This field indicates the timing mode of the system. Valid timing modes for IBM's z/Architecture include, for instance, local timing mode, ETR (External Time Reference) timing mode, STP timing mode;

b) System Timing State 404—This field indicates the timing state of the system. Examples of timing state include unsynchronized and synchronized;

c) Maximum Skew Rate 406—This field includes a value indicating the absolute value of the unknown skew rate of the physical clock. This value has a resolution of, for instance, one part per $2^{44}$. The maximum skew rate field is valid when it is non-zero.

d) Leap Seconds Update Event Time 408—This field includes a value indicating the primary reference time (PRT) at which the new leap seconds value takes effect. The new leap seconds field is valid when, for instance, this field is non-zero. As is known, primary reference time is a standardized time provided by a chosen clock located, for instance, in Fort Collins, Colo. (or in other designated locations). It is a clock separate from the TOD clock, and used as a reference clock (e.g., to set other clocks, determine accuracy of other clocks, etc.).

e) Old Leap Seconds 410—This field includes a value indicating the number of leap seconds in effect prior to the leap seconds update event. Thus, when the leap seconds update event time is non-zero, the old leap seconds value is in effect for a primary reference time less than the leap seconds update event time. When the leap seconds update event time is zero, the old leap seconds value is currently in effect and no change has been scheduled. The value is provided in seconds with the low order bit equaling one second, as one example.

f) New Leap Seconds 412—This field includes a value indicating the number of leap seconds in effect for a primary reference time equal to or greater than the leap seconds update event time. The value is provided in seconds with the low order bit equaling one second, as one example. The new leap seconds field is valid when the leap seconds update event time is non-zero.

g) PRT Update Event Time 414—This field includes a value indicating the value of CST (coordinated server time (Tq)) at the most recent time that the PRT parameters (e.g., PRT CST dispersion, PRT CST offset, PRT correaction start time, and estimated PRT correaction duration) were updated. The PRT update event time field is valid when it is non-zero.

h) PRT CST Dispersion 416—This field includes a value indicating the PRT CST dispersion computed at the most recent PRT update event. This value is, for instance, in clock units, and as such, a specified bit of the field (e.g., bit 63) has a resolution equal to a corresponding specified bit of the time of day clock.

i) PRT CST Offset 418—This field includes a value indicating the PRT CST offset computed at the most recent PRT update event. The value is, for instance, in clock units, and as such, a specified bit (e.g., bit 63) has a resolution equal to a corresponding specified bit of the time of day clock. The PRT CST offset added to coordinated server time (CST), ignoring a carry, if any, out of a specified bit (e.g., bit zero), forms primary reference time (PRT).

j) PRT Correaction Start Time 420—This field includes a value indicating the time at which the PRT correaction steering is initiated.

k) Estimated PRT Correaction Duration 422—This field includes a value indicating the estimated length of time required to steer out the PRT CST offset. The value is, for instance, in clock units, and as such, a specified bit (e.g., bit 63) has a resolution equal to a corresponding specified bit of the TOD clock.

l) CST Update Event Time 424—This field includes a value indicating the value of the basic machine TOD clock (Tb) at the most recent time that the CST parameters (e.g., CST TOD dispersion and CST TOD offset) were updated.

m) CST TOD Dispersion 426—This field includes a value indicating the CST TOD dispersion computed at the most recent CST update event. This value is, for instance, in clock units, and as such, a specified bit of this value (e.g., bit 63) has a resolution equal to a corresponding specified bit of the time of day clock.

n) CST TOD Offset 428—This field includes a value indicating the CST TOD offset computed at the most recent CST update event. This value is, for instance, in clock units, and as such, a specified bit of this field (e.g., bit 63) has a resolution equal to a corresponding specified bit of the time of day clock. The CST TOD offset added to the basic machine time of day clock, ignoring a carry, if any, out of a defined bit (e.g., bit 0), forms coordinated server time.

UIB 400 includes information to convert from a time of day clock timestamp to primary reference time (PRT), and then from PRT to Coordinated Universal Time (UTC). The time of day clock timestamp is, for instance, a 64 bit unsigned binary number indicating the number of clock units since the TOD clock epoch.

Examples of how to convert from TOD to PRT, and from PRT to UTC are described below. In the examples, the following abbreviations and symbols are used:

| Symbol | Meaning |
|---|---|
| φ | Maximum Skew Rate in dimensionless units. |
| C | Estimated PRT-Correction Duration |
| CST | Coordinated Server Time |
| Dqb(T) | CST-TOD Offset at time T |
| Dqb(U) | CST-TOD Offset at time U |
| Dzb(T) | PRT-TOD Offset at time T |
| Dzq(T) | PRT-CST Offset at time T |
| Dzq(V) | PRT-CST Offset at time V |
| Eqb(T) | CST-TOD Dispersion at time T |
| Eqb(U) | CST-TOD Dispersion at time U |
| Ezb(T) | PRT-TOD Dispersion at time T |
| Ezq(T) | PRT-CST Dispersion at time T |
| Ezq(V) | PRT-CST Dispersion at time Vq |
| J(T) | PRT-CST-Offset Correction at time T |
| MSR | Maximum Skew Rate |
| PRT | Primary Reference time |
| | PRT corresponds to TAI - 10 seconds and is in ETR-timestamp format. |
| T | Time in mathematical units |
| Tb | Time T represented in basic-machine TOD clock epoch |
| Tq | Time T represented in CST epoch |
| Tz | Time T represented in PRT epoch |
| TAI | International Atomic Time |
| U | CST-Update-Event Time in mathematical units |
| Ub | CST-Update-Event Time (in Tb epoch) |
| UTC | Coordinated Universal Time |
| V | PRT-Update-Event Time in mathematical units |
| Vq | PRT-Update-Event Time (in Tq epoch) |
| W | PRT-Correction Start Time in mathematical units |
| Wq | PRT-Correction Start Time (in Tq epoch) |

To convert from a TOD clock timestamp to primary reference time, the following fields of the UIB are employed, in one embodiment:

| Symbol | Field |
|---|---|
| MSR | Maximum Skew Rate |
| Ub | CST Update Event Time (in Tb epoch) |
| Eqb(U) | CST TOD Dispersion at time U |
| Dqb(U) | CST TOD Offset at time U |
| Vq | PRT Update Event time (in Tq epoch) |
| Ezq(V) | PRT CST Dispersion at time V |
| Dzq(V) | PRT CST Offset at time V |
| Wq | PRT Correction Start Time (in Tq epoch) |
| C | Estimated PRT Correction Duration |

In general, this conversion is represented by $Tz = Tb + Dzb \pm Ezb$, where Tb is a time value (e.g., 64-bit TOD value) obtained by issuing a STORE CLOCK instruction in the basic machine (or otherwise obtaining the TOD), Tz is the most likely corresponding primary reference time value, Dzb is the offset between Tz and Tb, and Ezb is the error bound (dispersion) for Tz.

More specifically, the conversion is computed, as follows: $Tb + Dzb(T) - Ezb(T) \leq Tz \leq Tb + Dzb(T) + Ezb(T)$, where Dzb(T) and Ezq(T) are the PRT TOD Offset and PRT TOD Dispersion, respectively, at time T.

Expanding, the above inequalities become:

$$Tb + Dzq(V) - J(T) + Dqb(U) - Ezq(V) - Eqb(U) - \phi \cdot (T-V) \leq Tz$$

$$Tz \leq Tb + Dzq(V) - J(T) + Dqb(U) + Ezq(V) + Eqb(U) + \phi \cdot (T-V)$$

This expansion is based on the following:
Let:
$\phi = MSR \cdot 2^{-44}$
Then:
$Ezb(T) \leq Ezq(V) + Eqb(U) + \phi \cdot (T-V)$
Given:
$V \leq U \leq T$
And:
For $V \leq T \leq W$: $J(T) = 0$
For $W \leq T \leq W+C$: $J(T) = Dzq(V) \cdot (T-W)/C$ For W+C≦T: J(T)=Dzq(V)
Then:
Dzb(T)=Dzq(V)−J(T)+Dqb(U)

To convert from primary reference time to UTC, in one embodiment, the following fields in the UIB are used: leap seconds update event time, old leap seconds, and new leap seconds fields. For a primary reference time less than the leap seconds update event time, the old leap seconds value applies; for a primary reference time equal to or greater than the leap seconds update event time, the new leap seconds value applies. The applicable leap second value is added to UTC to form primary reference time (PRT).

Described in detail above is a capability for efficiently obtaining information, directly by an application program, that is usable in determining the quality of time in relation to Coordinated Universal Time.

One or more aspects of the present invention can be included in an article of manufacture (e.g., one or more computer program products) having, for instance, computer useable media. The media has therein, for instance, computer readable program code means of logic (e.g., instructions, code, commands, etc.) to provide and facilitate the capabilities of the present invention. The article of manufacture can be included as a part of a computer system or sold separately.

Figure 5:
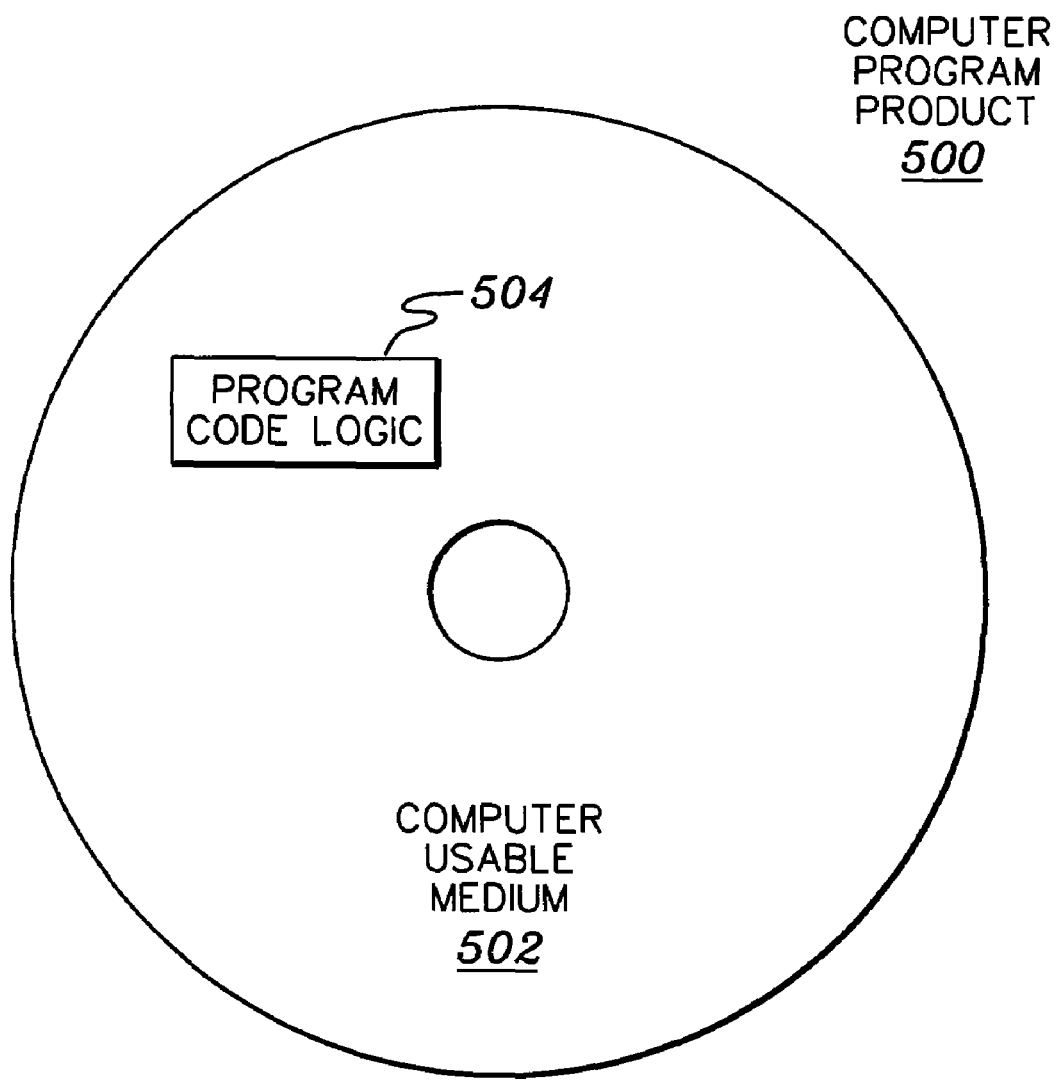
FIG. 5 depicts one embodiment of a computer program product incorporating one or more aspects of the present invention.

One example of an article of manufacture or a computer program product incorporating one or more aspects of the present invention is described with reference to FIG. 5. A computer program product 500 includes, for instance, one or more computer usable media 502 to store computer readable program code means or logic 504 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, an application program is able to directly obtain information usable in determining the quality of time without having to invoke a supervisor service. This enables the information to be obtained more efficiently and more cost effectively.

Although various embodiments are described above, these are only examples. One or more variations can be made without departing from the spirit of the present invention. For instance, the processing environment may include only one processing unit or more than two processing units. Further, in yet another embodiment, one or more of the processing units is a central processing complex having one or more central processors, each central processor having a TOD clock. The central processor complex is logically partitioned, in one example, and includes one or more logical partitions. Further, processing environments based on architectures other than the z/Architecture can include one or more aspects of the present invention. Additionally, one or more of the processing units may be other than a z/Series® server. Yet further, information may be obtained relating to system clocks other than time of day clocks. Also, the timing information can be stored in areas of memory other than the hardware system timing area, or in storage.

Although in the example above, an instruction is performed in order to request and obtain the quality of time information, in other embodiments, an instruction may not be used. Yet further, in another example, one instruction may be used to invoke the request and another instruction may provide the requested information. Further, the term parameter block is not meant to be limiting in any way. Any type of block or data structure can be used to return the information. Yet further, the external time reference may be a reference other than Coordinated Universal Time. Further, although various fields and parameters are described, many variations are possible with these fields and parameters. Many other variations are also possible.

Again, although various embodiments are described herein, these are not meant to limit the scope of the present invention. Many variations may be made without departing from the spirit of the present invention.

As a further embodiment, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although preferred embodiments have been depicted and described in detail there, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of facilitating a determination of the quality of time produced by clocks of processing environments, said method comprising:
   providing, by a clock of a central processor of the processing environment, a current time value and continuously updating by hardware of the processing environment the current time value, the processing environment comprising a supervisor service processing layer and an application program processing layer; and
   issuing a request, by an application program running within the application program processing layer of the processing environment, for information usable in determining the accuracy of the time value relative to an external time standard, the request being made via a perform timing facility function instruction, wherein execution of the perform timing facility function selects desired information and places the information in a parameter block specified by the application program, the parameter block being located in memory of the processing environment at an address specified in a general register by the perform timing facility function instruction, the parameter block being directly accessible by the application program, and wherein the information is obtained by the application program absent use of a supervisor service of the supervisor service processing layer.

2. The method of claim 1, wherein the information includes information usable in converting the time value to a primary reference time.

3. The method of claim 2, wherein the information usable in converting the time value to the primary reference time includes two or more of the following: a maximum skew rate, a coordinated server time update event time, a coordinated server time time of day dispersion, a primary reference time update event time, a primary reference time coordinated server time dispersion, a primary reference time correction start time, and an estimated primary reference time correction duration.

4. The method of claim 2, wherein the information further includes information usable in converting the primary reference time to the external time standard.

5. The method of claim 4, wherein the information usable in converting the primary reference time to the external time standard includes one or more of the following: leap seconds update event time, old leap seconds and new leap seconds.

6. The method of claim 1, wherein the clock comprises a time of day (TOD) clock of a processor of the processing environment.

7. The method of claim 1, wherein the external time standard comprises Coordinated Universal Time.

* * * * *